(12) United States Patent
Zhang et al.

(10) Patent No.: US 10,084,660 B2
(45) Date of Patent: Sep. 25, 2018

(54) METHOD AND SYSTEM FOR COLLECTING STATISTICS ON NETWORK COMMUNICATION DATA

(71) Applicant: Tencent Technology (Shenzhen) Company Limited, Shenzhen (CN)

(72) Inventors: Tao Zhang, Shenzhen (CN); Lichun Li, Shenzhen (CN); Chen Tao, Shenzhen (CN); Feng Lu, Shenzhen (CN); Sen Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 265 days.

(21) Appl. No.: 15/211,773

(22) Filed: Jul. 15, 2016

(65) Prior Publication Data
US 2016/0330081 A1    Nov. 10, 2016

Related U.S. Application Data

(63) Continuation of application No. PCT/CN2015/075128, filed on Mar. 26, 2015.

(30) Foreign Application Priority Data

Mar. 27, 2014   (CN) .......................... 2014 1 0118274

(51) Int. Cl.
*G06F 15/173* (2006.01)
*H04L 12/24* (2006.01)
*H04L 29/08* (2006.01)

(52) U.S. Cl.
CPC ........ *H04L 41/142* (2013.01); *H04L 41/0853* (2013.01); *H04L 67/02* (2013.01); *H04L 67/10* (2013.01)

(58) Field of Classification Search
CPC ... H04L 41/0853; H04L 41/142; H04L 67/02; H04L 67/10
See application file for complete search history.

(56) References Cited

U.S. PATENT DOCUMENTS 6,658,471 B1 * 12/2003 Berry .................. G06F 11/3466
                                                    709/224
8,266,276 B1 *  9/2012 Vasudeva ............ G06F 11/3409
                                                    709/202

(Continued)

FOREIGN PATENT DOCUMENTS

| CN | 101373534 A | 2/2009 |
|----|-------------|--------|
| CN | 102592156 A | 7/2012 |
| SG |    155789 A1 | 7/2012 |

OTHER PUBLICATIONS

Tencent Technology, ISRWO, PCT/CN2015/075128, dated Jul. 8, 2015, 6 pgs.

(Continued)

*Primary Examiner* — Mohamed A Wasel
(74) *Attorney, Agent, or Firm* — Morgan, Lewis & Bockius LLP

(57) ABSTRACT

A method for collecting statistics on network communication data includes: acquiring, by a first client, an identification code, requesting corresponding webpage content from a server according to the identification code, and displaying the webpage content; receiving, by the first client, a user-entered communication operation instruction including an operation type, sending the instruction to the server, and receiving an operation binding identification code that is returned by the server; acquiring, by a second client, the operation binding identification code displayed on the first client, and extracting the first client operation information and the entry prompt information from the operation binding identification code, the first client operation information (Continued)

including an operation type; and acquiring, by the second client, operation description information based on the entry prompt information, generating a binding relationship between the first client operation information and the operation description information, and sending the binding relationship to the server for statistics collection.

16 Claims, 5 Drawing Sheets

(56) References Cited

U.S. PATENT DOCUMENTS

| | | | |
|---|---|---|---|
| 2010/0005316 A1* | 1/2010 | LeGendre | G06F 11/3636 713/189 |
| 2016/0085763 A1* | 3/2016 | Tatourian | H04L 67/10 707/662 |
| 2016/0224898 A1* | 8/2016 | Ryckbosch | G06N 99/005 |
| 2017/0201237 A1* | 7/2017 | Montgomery | H03H 21/0012 |
| 2017/0353860 A1* | 12/2017 | Zhang | H04L 63/102 |

OTHER PUBLICATIONS

Tencent Technology, IPRP, PCT/CN2015/075128, dated Sep. 27, 2016, 4 pgs.

* cited by examiner

US 10,084,660 B2

METHOD AND SYSTEM FOR COLLECTING STATISTICS ON NETWORK COMMUNICATION DATA

RELATED APPLICATIONS

This application is a continuation application of PCT Patent Application No. PCT/CN2015/075128, entitled "METHOD AND SYSTEM FOR COLLECTING STATISTICS ON NETWORK COMMUNICATION DATA" filed on Mar. 26, 2015, which claims priority to Chinese Patent Application No. 201410118274.0, "METHOD AND SYSTEM FOR COLLECTING STATISTICS ON NETWORK COMMUNICATION DATA," filed on Mar. 27, 2014, both of which are hereby incorporated by reference in their entirety.

FIELD OF THE TECHNOLOGY

The present disclosure relates to network communications technologies, and in particular, to a method and a system for collecting statistics on network communication data.

BACKGROUND OF THE DISCLOSURE

At present, in a network communication service, a user can directly log in to a URL, and access the URL from an online portal, to access a related web page. In addition, a server collects statistics on network communication data during communication. During online network communication, specifically, the user opens a communication client, logs in to the client, and selects a web page to access according to requirements; during browsing of the web page, the user may further select a preferred object, enter an operation request, and send the operation request to a server; the server performs corresponding operation processing, and collects statistics on data in the whole network communication process. Due to data statistics collection, the statistics can be subsequently invoked and viewed when required, and the whole network communication process can further be monitored and maintained.

However, in the case of offline triggering, for example, in a case in which the user logs in to a URL by using a scan code and browses related webpage content, a network side does not perform statistics collection in the network communication process and therefore cannot obtain corresponding network communication data.

SUMMARY

An exemplary method for collecting statistics on network communication data associated with a first user account of a network application running at a first client and a second user account of the network application running at a second client includes:

acquiring, by the first client, an identification code;

requesting, by the first client, corresponding webpage content from the server according to the identification code;

receiving and displaying, by the first client, the webpage content;

receiving, by the first client, a user-entered communication operation instruction comprising an operation type associated with the webpage content;

sending, by the first client, the communication operation instruction to the server;

receiving and displaying, by the first client, an operation binding identification code that is returned by the server, wherein the operation binding identification code includes first client operation information associated with the first user account and entry prompt information;

acquiring, by the second client, the operation binding identification code displayed on the first client;

extracting, by the second client, the first client operation information associated with the first user account and the entry prompt information from the operation binding identification code; and acquiring, by the second client, operation description information based on the entry prompt information, the operation description information including identity information associated with the second user account;

generating, by the second client, a binding relationship between the first client operation information and the operation description information; and sending, by the second client, the binding relationship to the server, wherein the server is configured to associate the binding relationship with the second user account.

A distributed network system comprises a server, a first client, and a second client. A first user account of a network application running at the first client and a second user account of the network application running at the second client exchange data via the server supporting the network application. The first client, the second client and the server perform the aforementioned exemplary method for collecting statistics on network communication data.

DESCRIPTION OF EMBODIMENTS

In order to make the objectives, technical solutions, and advantages of the present disclosure more comprehensible, the present disclosure is described in further detail below with reference to embodiments and the accompanying drawings.

In the present disclosure, a first client triggers statistics collection on network communication data; after a communication operation is completed, a second client generates a binding relationship according to an operation binding identification code or a random identification code that is returned by a server to the first client, and sends the binding relationship to the server for statistics collection.

Figure 1:
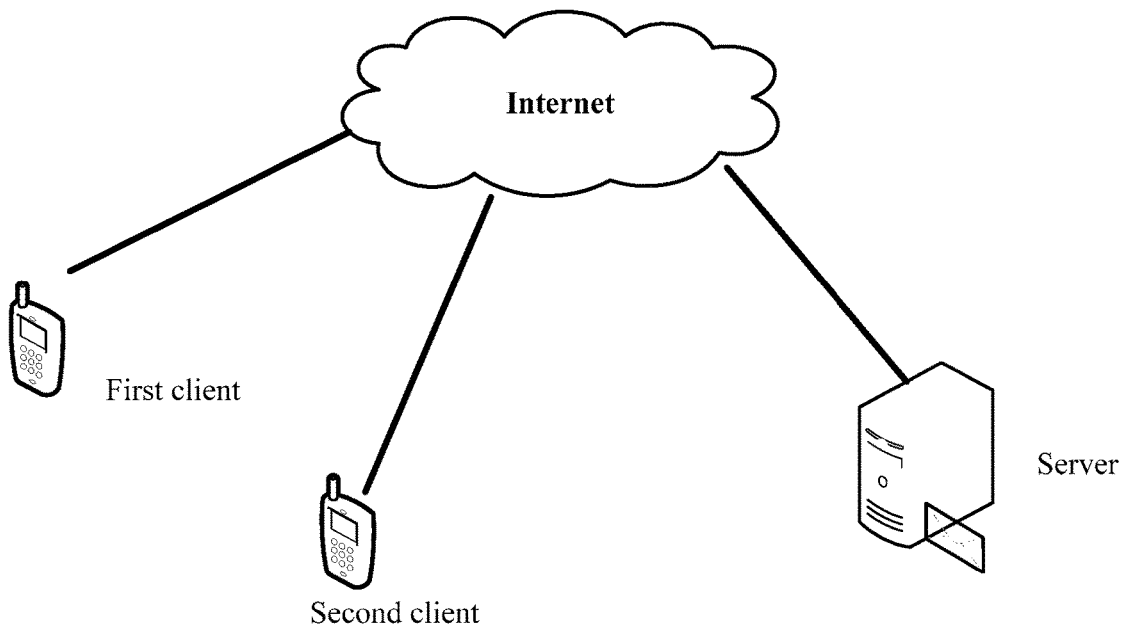
FIG. 1 is a schematic diagram of a network application environment in which statistics on network communication data are collected according to the present disclosure.

As shown in FIG. 1, FIG. 1 is a schematic diagram of an instance of a distributed network system supporting a network application according to the present disclosure, including a first client, a second client, and a server. The network application includes a first user account running at the first client and a second user account running at the second client. The two user accounts exchange data with each other via the server. A device corresponding to the first client is specifically, for example, a smart device such as a mobile phone, and information may be entered to the first client by operations performed on a keyboard or a screen of the smart device. During statistics collection on network communication data, related data is stored in a storage medium of the smart device, is sent out by a wireless interface of the smart device, and is transferred to a receiver via the network. A device corresponding to the second client may be implemented by using a common smart device, and has a structure similar to that of the device corresponding to the first client; or may also be implemented by using a dedicatedly configured application device, where the dedicated device only provides a function of statistics collection on network data of the present disclosure, and operates more rapidly and conveniently. The first client and the second client cooperate to generate a binding relationship, and then upload the binding relationship to the server via the network.

Figure 2:
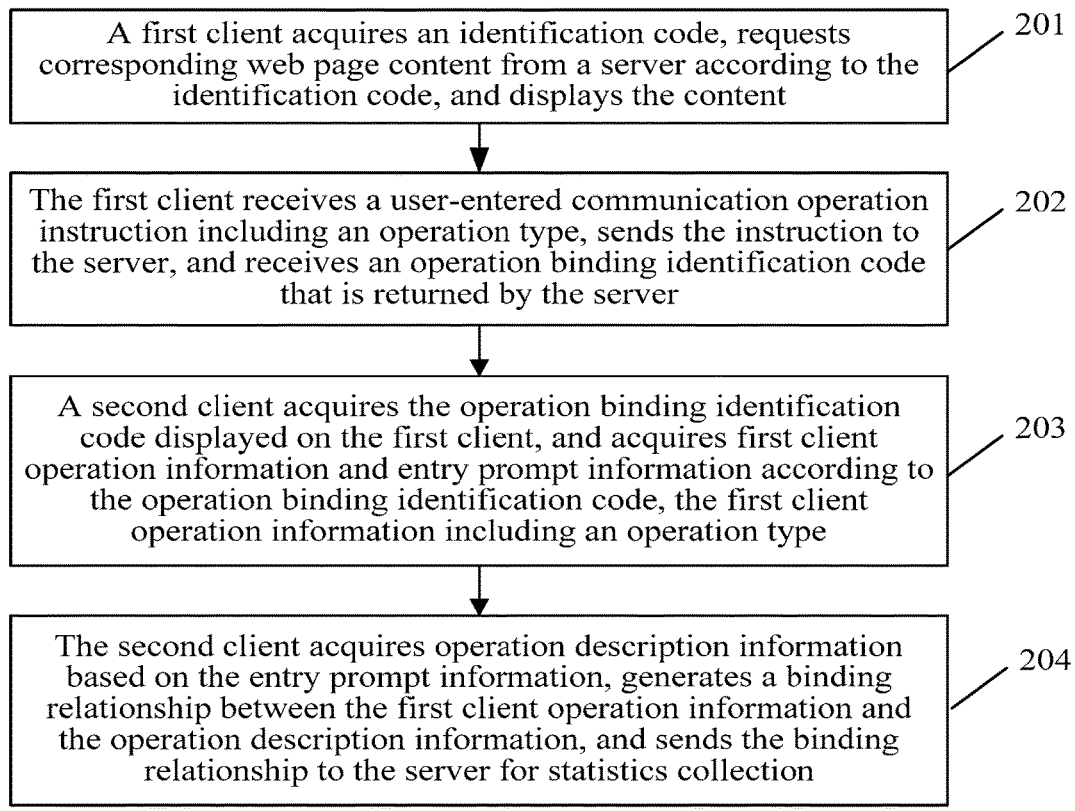
FIG. 2 is a first schematic flowchart of a method for collecting statistics on network communication data according to the present disclosure.

The present disclosure provides two solutions to data statistics collection, which are respectively based on an operation binding identification code and a random identification code. The following describes the solutions separately. Referring to FIG. 2, FIG. 2 is a first schematic flowchart of a method for collecting statistics on network communication data according to the present disclosure. The method performs data statistics collection based on an operation binding identification code, and includes the following steps:

Step 201: A first client acquires an identification code, requests corresponding webpage content from a server according to the identification code, and displays the webpage content.

The identification code corresponds to webpage content on a network side, which is, for example, an identification code on an item; and webpage content related to the item can be requested from the server according to the identification code.

The identification code may be implemented according to requirements, and is described below by using a one-dimensional barcode and a two-dimensional barcode as examples.

1) When the identification code is a one-dimensional barcode, specifically for example, a bar code:

the requesting corresponding webpage content from a server according to the identification code includes: parsing, by the first client, a GB code corresponding to the identification code, and sending the GB code to the server; and extracting, by the server, a URL corresponding to the GB code, and returning webpage content corresponding to the URL to the first client.

2) When the identification code is a two-dimensional barcode:

the requesting corresponding webpage content from a server according to the identification code includes: parsing, by the first client, a URL corresponding to the identification code, and requesting webpage content corresponding to the URL from the server.

Step 202: The first client receives a user-entered communication operation instruction including an operation type, sends the instruction to the server, and receives an operation binding identification code that is returned by the server.

After the first client displays the webpage content, a user may enter the communication operation instruction on the web page; and specifically, the user may perform selection from displayed operation types, and may further enter an object type, a destination address, and the like according to requirements, and then tap a "confirm key" to send the communication operation instruction to the server.

After receiving the communication operation instruction, the server generates first client operation information, where the first client operation information includes description information of the first client, such as a user name, and further includes operation information of the first client, such as an operation type; generates the operation binding identification code corresponding to the first client operation information and entry prompt information, and returns the operation binding identification code to the client, where the entry prompt information may be specifically in the form of a prompt box, a user may enter operation description information according to the prompt, and the operation description information is description information related to a current network communication operation, used to describe the current network communication operation.

The operation type includes an instant object exchange operation and a delayed object exchange operation.

When the selected operation type is the instant object exchange operation, the communication operation instruction further includes an object type and a destination address. After the first client sends the operation instruction to the server, the method further includes: sending, by the server, an execution operation that includes the object type and the destination address to an execution apparatus; and identifying, by the execution apparatus according to the execution instruction, an object matching the object type, and sending the object to the destination address.

When the selected operation type is the delayed object exchange operation, the communication operation instruction may further include an object type. After the first client sends the operation instruction to the server, the server saves the communication operation instruction; and then, the user may access the server again as required, enter a destination address, and modify the delayed object exchange operation into an instant object exchange operation; correspondingly, the server sends an execution instruction that includes the object type and the destination address to an execution apparatus, and the execution apparatus invokes, according to the execution instruction, an object matching the object type and sends the object to the destination address.

Step 203: A second client acquires the operation binding identification code displayed on the first client, and acquires first client operation information and entry prompt information according to the operation binding identification code, the first client operation information including an operation type.

The first client only reports information about an operation of the first client, and cannot report description information related to a current network communication operation; and herein, the second client participates in the process. The second client acquires operation description information, binds the operation description information and the first client operation information, and reports a binding relationship to the server for statistics collection, which is specifically implemented in steps 203 and 204.

The operation binding identification code may be specifically implemented according to requirements, and is described below by using a one-dimensional barcode and a two-dimensional barcode as examples.

1) When the operation binding identification code is the one-dimensional barcode:

the extracting the first client operation information and the entry prompt information from the operation binding identification code includes: parsing, by the second client, a GB code corresponding to the operation binding identification code, and sending the GB code to the server; and extracting, by the server, first client operation information and entry prompt information that correspond to the GB code, and returning the first client operation information and the entry prompt information to the second client.

2) When the operation binding identification code is the two-dimensional barcode:

the extracting the first client operation information and the entry prompt information from the operation binding identification code includes: identifying, by the second client, the operation binding identification code, to obtain the first client operation information and the entry prompt information.

Step 204: The second client acquires operation description information based on the entry prompt information, generates a binding relationship between the first client operation information and the operation description information, and sends the binding relationship to the server for statistics collection.

In this step, the acquiring, by the second client, operation description information based on the entry prompt information may be implemented in multiple manners, for example:

receiving, by the second client, the operation description information that is entered according to the entry prompt information by a user; or locally extracting, by the second client, the operation description information that is saved in advance.

In the present disclosure, a first client triggers statistics collection on network communication data; after a communication operation is completed, a second client generates a binding relationship according to an operation binding identification code that is returned by a server to the first client, and sends the binding relationship to the server for statistics collection, thereby implementing data statistics collection during network communication triggered offline.

Figure 3:
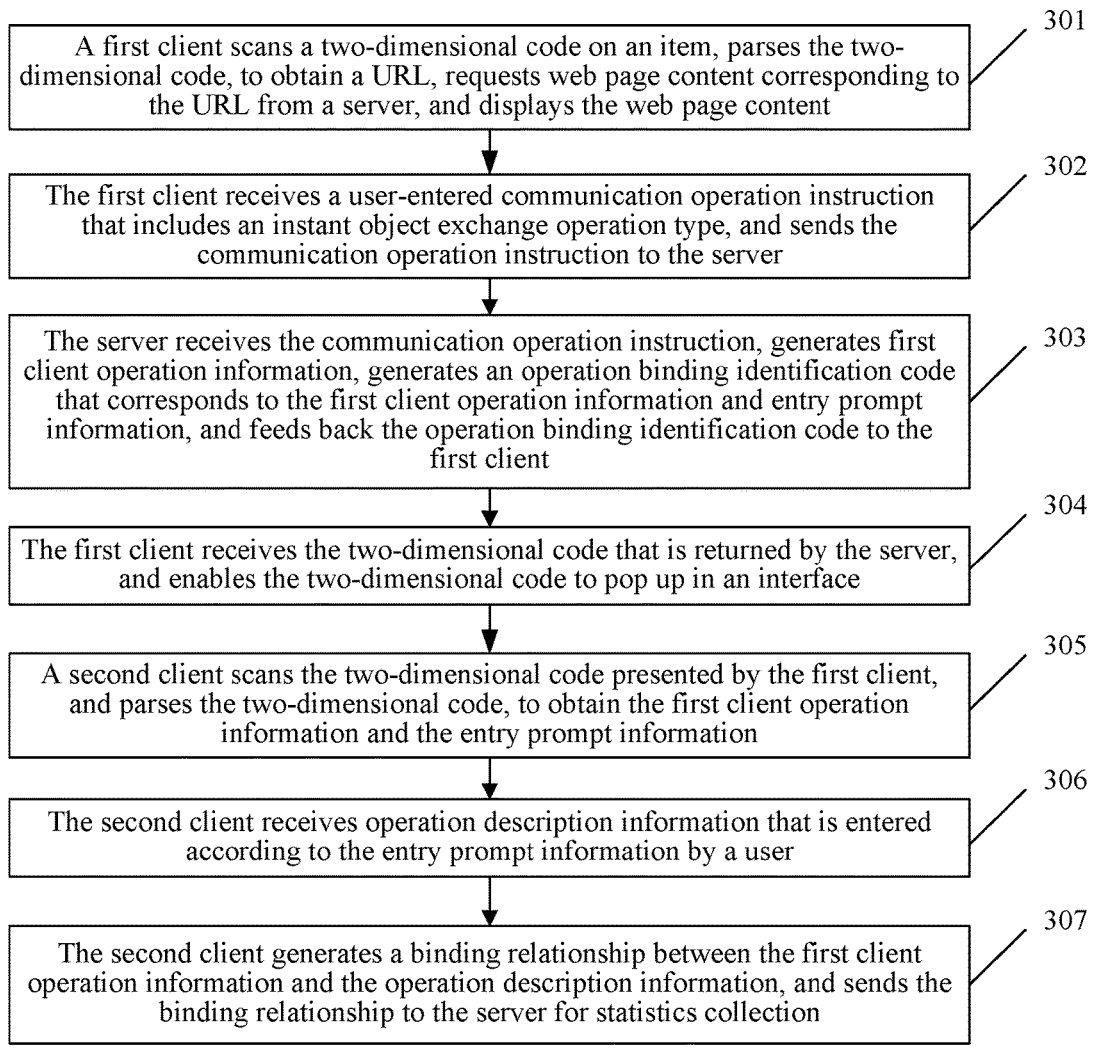
FIG. 3 shows a first instance of a method for collecting statistics on network communication data in an item browsing scenario.

The present disclosure can be applied to various network communication scenarios triggered offline. Description is given below by using an offline interaction on a w-commerce platform as an instance. The w-commerce platform is an O2O (Online To Offline) shopping platform based on WeChat. During online shopping, a user independently purchases an item by using the WeChat client in the w-commerce shopping mall. Merchants who open stores on the w-commerce platform generally set up physical stores offline, the user may also purchase an item in the physical stored; and in the physical store, the user may be instructed by a shopping guide, and completes, by scanning an identification code on the item, an interaction process triggered offline, where the interaction includes an instant object exchange operation, namely, completing purchasing instantly, and further includes a delayed object exchange operation, namely, only adding the item to favorites and delaying the purchasing. An existing e-commerce service and physical store service, that is, an interaction triggered online and an interaction triggered offline, are completely independent from each other, and data statistics collection during the network communication triggered offline cannot be implemented. Because the online process and the offline process are completely independent from each other, personnel working on the offline process highly repel the online process, and it is difficult to coordinate interest distribution therebetween; and the personnel working on the offline process rarely have opportunity to participate in the online process. The solution of the present disclosure is applied to the w-commerce scenario triggered offline, to implement data statistics collection during network communication triggered offline and clearly position different applications of the online process in different scenarios, thereby balancing the interest distribution between the online process and the offline process, solving an inventory problem for the merchant, and greatly improving the goods transfer efficiency for the merchant. FIG. 3 shows a first instance of a method for collecting statistics on network communication data in an item browsing scenario according to the present disclosure, which includes the following steps:

Step 301: A first client scans a two-dimensional barcode on an item, parses the two-dimensional barcode, to obtain a URL, requests webpage content corresponding to the URL from a server, and displays the webpage content.

In this instance, the first client is, for example, the WeChat client for implementing w-commerce on a mobile phone of a user. Under instruction by a shopping guide in a store, the user opens the WeChat client on the mobile phone, scans the two-dimensional identification code on the item by using a scanning function of the WeChat client; and then, the WeChat client parses the two-dimensional identification code, to obtain a corresponding URL, requests webpage content corresponding to the URL from the server, and displays the webpage content.

Step 302: The first client receives a user-entered communication operation instruction that includes an instant object exchange operation type, and sends the communication operation instruction to the server.

After the first client displays the webpage content, a user may enter the communication operation instruction on the web page; specifically, the user may perform selection from displayed operation types, may further enter an object type, a destination address, and the like according to requirements, and then tap a "confirm key" to send the communication operation instruction to the server.

In this instance, the operation type is an instant object exchange operation, that is, an ordering operation; and in this case, the communication operation instruction further includes an object type and a destination address, where the object type is, for example, the color, the model, and the like of the item, and the destination address is, for example, a mailing address of the user.

Step 303: The server receives the communication operation instruction, generates first client operation information, generates an operation binding identification code corresponding to the first client operation information and entry prompt information, and returns the operation binding identification code to the first client.

The first client operation information includes description information of the first client, and may be provided for the server when the user logs in to the first client, where the description information includes a user name, an account, and the like; and the first client operation information further includes operation information of the first client, for example, an operation type and the like. The entry prompt information may be specifically in the form of a prompt box, and the user may enter operation description information according to the prompt, where the operation description information is description information related to a current network communication operation, used to describe the current network communication operation.

After receiving the communication operation instruction, the server further sends an execution instruction that includes the object type and the destination address to an execution apparatus; and the execution apparatus invokes, according to the execution instruction, an object matching the object type, and sends the object to the destination address.

In this instance, the operation binding identification code is a two-dimensional barcode.

Step 304: The first client receives the two-dimensional barcode that is returned by the server, and enables the two-dimensional barcode to pop up in an interface.

Step 305: A second client scans the two-dimensional barcode displayed on the first client, and parses the two-dimensional barcode, to obtain the first client operation information and the entry prompt information.

In this instance, the second client is, for example, the WeChat client for implementing w-commerce on a mobile terminal. A shop assistant opens the WeChat client on the mobile terminal, and scans the two-dimensional identification code popping up on the first client by using a scanning function of the WeChat client; and then the WeChat client parses the two-dimensional identification code, to obtain the corresponding first client operation information and entry prompt information.

Step 306: The second client receives operation description information that is entered according to the entry prompt information by a user.

In this step, the acquiring operation description information based on the entry prompt information is specifically implemented as follows: receiving the operation description information that is entered according to the entry prompt information by the user.

During specific implementation, a dedicated w-commerce application (APP) client may be configured for the shop assistant, and the shop assistant may enter operation description information in advance by using the w-commerce APP client; in this way, the shop assistant may directly extract the stored operation description information when required, to simplify the operation. In a case in which the w-commerce APP client is used, the acquiring operation description information based on the entry prompt information is specifically implemented as follows: locally extracting, by the second client, the operation description information that is saved in advance.

In this instance, the operation description information may be specifically store information and shop assistant information.

Step 307: The second client generates a binding relationship between the first client operation information and the operation description information, and sends the binding relationship to the server for statistics collection.

Figure 4:
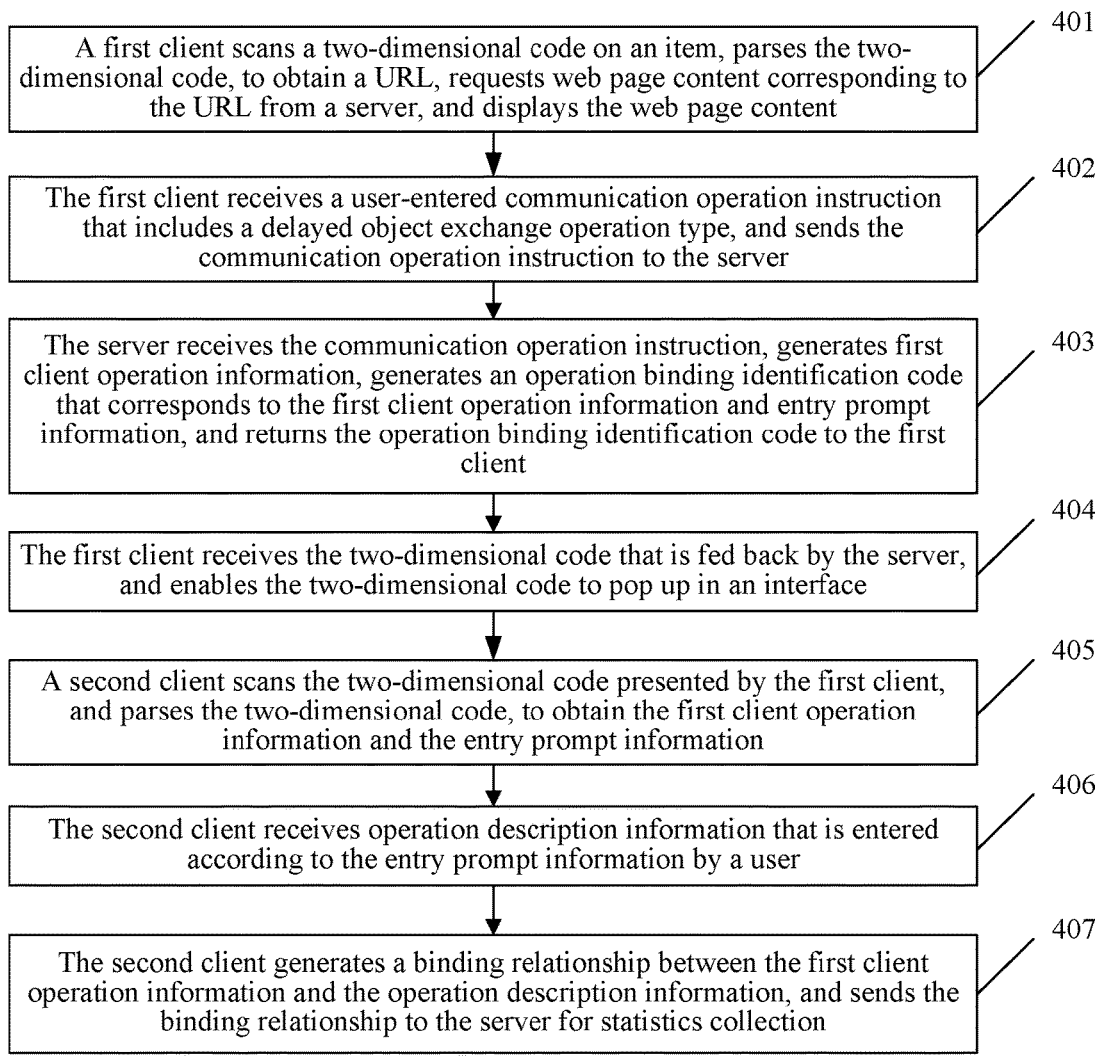
FIG. 4 shows a second instance of a method for collecting statistics on network communication data in an item browsing scenario.

FIG. 3 shows an instance in which the operation type is an instant object exchange operation, and an instance in which the operation type is a delayed object exchange operation is described by using a process in FIG. 4, which includes the following steps:

Step 401: A first client scans a two-dimensional identification code on an item, parses the two-dimensional identification code, to obtain a URL, requests webpage content corresponding to the URL from a server, and displays the webpage content.

Step 402: The first client receives a user-entered communication operation instruction that includes a delayed object exchange operation type, and sends the communication operation instruction to the server.

In this instance, the operation type is a delayed object exchange operation, namely, adding an item to favorites; and in this case, the communication operation instruction further includes an object type, where the object type is, for example, the color, the model, and the like of the item. After the first client sends the operation instruction to the server, the server saves the communication operation instruction; and then, the user may access the server again as required, enter a destination address, and modify the delayed object exchange operation into an instant object exchange operation; correspondingly, the server sends an execution instruction that includes the object type and the destination address to an execution apparatus, and the execution apparatus invokes, according to the execution instruction, an object matching the object type and sends the object to the destination address.

Step 403: The server receives the communication operation instruction, generates first client operation information, generates an operation binding identification code corresponding to the first client operation information and entry prompt information, and returns the operation binding identification code to the first client.

In this instance, the operation binding identification code is a two-dimensional barcode.

Step 404: The first client receives the two-dimensional barcode that is returned by the server, and enables the two-dimensional barcode to pop up in an interface.

Step 405: A second client scans the two-dimensional barcode displayed on the first client, and parses the two-dimensional barcode, to obtain the first client operation information and the entry prompt information.

In this instance, the second client is, for example, the WeChat client for implementing w-commerce on a mobile terminal. A shop assistant opens the WeChat client on the mobile terminal, and scans the two-dimensional identification code popping up on the first client by using a scanning function of the WeChat client; and then the WeChat client parses the two-dimensional identification code, to obtain the corresponding first client operation information and entry prompt information.

Step 406: The second client receives operation description information that is entered according to the entry prompt information by a user.

In this step, the acquiring operation description information based on the entry prompt information is specifically implemented as follows: receiving the operation description information that is entered according to the entry prompt information by the user.

During specific implementation, a dedicated w-commerce application (APP) client may be configured for the shop assistant, and the shop assistant may enter operation description information in advance by using the w-commerce APP client; in this way, the shop assistant may directly extract the stored operation description information when required, to simplify the operation. In a case in which the w-commerce APP client is used, the acquiring operation description information based on the entry prompt information is specifically implemented as follows: locally extracting, by the second client, the operation description information that is saved in advance.

In this instance, the operation description information may be specifically store information and shop assistant information.

Step 407: The second client generates a binding relationship between the first client operation information and the operation description information, and sends the binding relationship to the server for statistics collection.

The server collects statistics on the binding relationship, and provides the statistics when required; in this way, an offline interaction condition of the service can be learned, and workloads of shop assistants in each store can further be obtained.

When statistics on network communication data is collected by using the instances shown in FIG. 3 and FIG. 4, different from the traditional online transaction manner and the simple offline transaction manner, the solution provided by the instances enables a user to purchase an item under the instruction by a shopping guide after entering a store, and when an item in the store is lack of a certain color or short in size, lets the shop assistant to guide the user to enter the online purchasing scenario provided by the present disclosure. The scenario is specifically as follows: the user is guided to scan a one-dimensional barcode or a two-dimensional barcode to enter a page showing detailed information of an item; if the user directly purchases the item, a two-dimensional barcode pops up to guide the user so that the shop assistant scans the two-dimensional barcode, and after the shop assistant writes the store information and work ID information, implement establishment of a binding relationship is established; if the user adds the item to favorites and does not purchase it, a two-dimensional barcode also pops up to guide the user so that the shop assistant scans the two-dimensional barcode, to implement establishment of a binding relationship.

Figure 5:
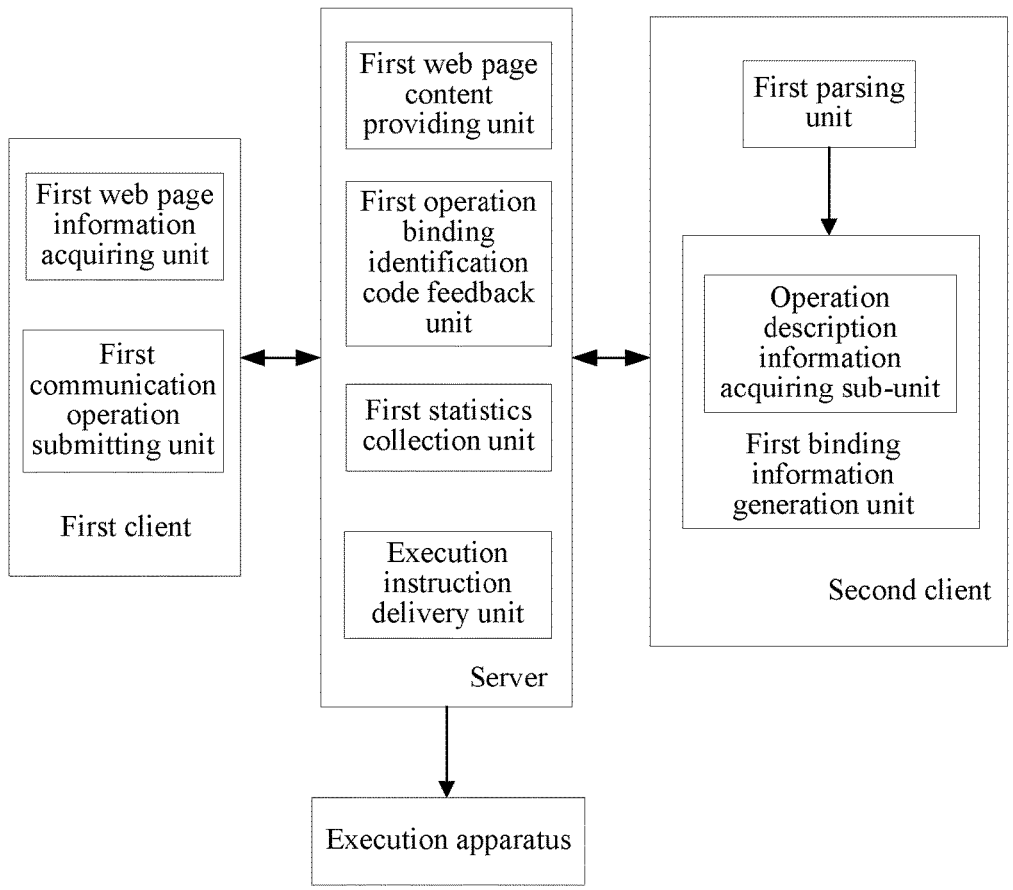
FIG. 5 is a first schematic structural diagram of a system for collecting statistics on network communication data according to the present disclosure.

Referring to FIG. 5, FIG. 5 is a schematic structural diagram of a system for collecting statistics on network communication data according to the present disclosure, and the system includes a first client, a second client, and a server.

The first client is configured to acquire an identification code, request corresponding webpage content from a server according to the identification code, and display the webpage content; receive a user-entered communication operation instruction including an operation type, send the instruction to the server, and receive an operation binding identification code that is returned by the server.

The second client is configured to acquire the operation binding identification code displayed on the first client, and acquire first client operation information and entry prompt information according to the operation binding identification code, the first client operation information including an operation type; acquire operation description information according to the entry prompt information, generate a binding relationship between the first client operation information and the operation description information, and send the binding relationship to the server.

The server is configured to return corresponding webpage content to the first client according to a request; receive a communication operation instruction from the first client, generate first client operation information including an operation type; encode the first client operation information and entry prompt information, to obtain an operation binding identification code, and send the operation binding identification code to the first client; and collect statistics on a binding relationship from the second client.

Preferably, the first client includes a first web page information acquiring unit and a first communication operation submitting unit; the second client includes a first parsing unit and a first binding information generation unit; and the server includes a first webpage content providing unit, a first bound identification code feedback unit, and a first statistics collection unit.

The first web page information acquiring unit is configured to acquire an identification code, request corresponding webpage content from the server according to the identification code, and display the webpage content.

The first communication operation submitting unit is configured to receive a user-entered communication operation instruction including an operation type, send the instruction to the server, and receive an operation binding identification code that is returned by the server.

The first parsing unit is configured to acquire the operation binding identification code displayed on the first client, acquire first client operation information and entry prompt information according to the operation binding identification code, and send the first client operation information and the entry prompt information to the first binding information generation unit, where the first client operation information includes an operation type.

The first binding information generation unit is configured to acquire operation description information based on the entry prompt information, generate a binding relationship between the first client operation information and the operation description information, and send the binding relationship to the server.

The first webpage content providing unit is configured to return corresponding webpage content to the first web page information acquiring unit according to a request.

The first bound identification code feedback unit is configured to receive the communication operation instruction from the first communication operation submitting unit, determine the first client operation information including the operation type, generate the operation binding identification code corresponding to the first client operation information and the entry prompt information, send the operation binding identification code to the first communication operation submitting unit, and generate the first client operation information including the operation type.

The first statistics collection unit is configured to collect statistics on the binding relationship from the first binding information generation unit.

Preferably, the identification code is a one-dimensional barcode or a two-dimensional barcode.

When the identification code is the one-dimensional barcode, the first web page information acquiring unit parses a GB code corresponding to the identification code, and sends the GB code to the first webpage content providing unit; the first webpage content providing unit extracts a URL corresponding to the GB code, and returns webpage content corresponding to the URL to the first web page information acquiring unit.

When the identification code is the two-dimensional barcode, the first web page information acquiring unit parses a URL corresponding to the identification code, and requests webpage content corresponding to the URL from the first webpage content providing unit.

Preferably, the first binding information generation unit includes an operation description information acquiring sub-unit, which is configured to receive operation description information that is entered according to the entry prompt information by the user, or locally extract operation description information that is saved in advance.

Preferably, the operation type includes an instant object exchange operation and a delayed object exchange operation. When the selected operation type is the instant object exchange operation, the communication operation instruction further includes an object type and a destination address, the server further includes an execution instruction delivery unit, and the system further includes an execution apparatus.

The execution instruction delivery unit is configured to receive an operation instruction from the first communication operation submitting unit, and send an execution instruction that includes the object type and the destination address to the execution apparatus.

The execution apparatus is configured to invoke, according to the execution instruction, an object matching the object type, and send the object to the destination address.

Preferably, the operation binding identification code is a one-dimensional barcode or a two-dimensional barcode.

When the operation binding identification code is the one-dimensional barcode, the first parsing unit parses a GB code corresponding to the operation binding identification code, and sends the GB code to the first bound identification code feedback unit; the first bound identification code feedback unit extracts first client operation information and entry prompt information that correspond to the GB code, and returns the first client operation information and the entry prompt information to the first parsing unit.

When the operation binding identification code is the two-dimensional barcode, the first parsing unit identifies the operation binding identification code, to obtain the first client operation information and the entry prompt information.

In the present disclosure, a first client triggers statistics collection on network communication data; after a communication operation is completed, a second client can generate a binding relationship according to either an operation binding identification code or a random identification code that is returned by a server to the first client, and then send the binding relationship to the server for statistics collection. A method for identifying a network communication operation by using the operation binding identification code is similar to a method for identifying the network communication operation by using the random identification code. The solution to identifying the network communication operation by using the random identification code is described in detail below with reference to FIG. 6 and FIG. 7.

Figure 6:
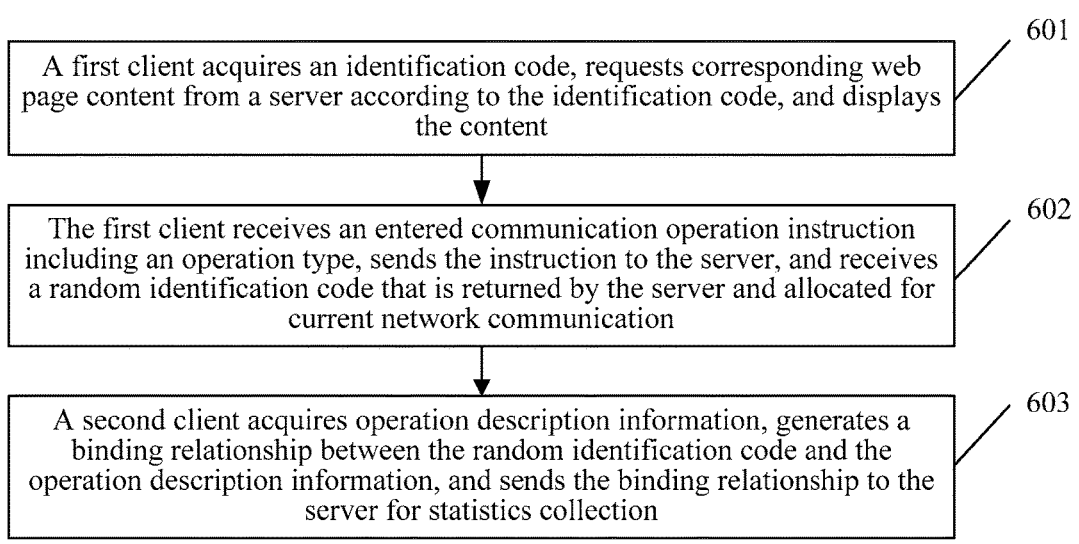
FIG. 6 is a second schematic flowchart of a method for collecting statistics on network communication data according to the present disclosure.

Referring to FIG. 6, FIG. 6 is a second schematic flowchart of a method for collecting statistics on network communication data according to the present disclosure. The method performs data statistics collection based on a random identification code, and includes the following steps:

Step 601: A first client acquires an identification code, requests corresponding webpage content from a server according to the identification code, and displays the content.

The identification code may be specifically implemented according to requirements, which is, for example, a one-dimensional barcode or a two-dimensional barcode. Refer to corresponding description in step 201 in the process shown in FIG. 2 for details.

Step 602: The first client receives a user-entered communication operation instruction including an operation type, sends the instruction to the server, and receives a random identification code that is returned by the server and allocated for current network communication.

After the first client displays the webpage content, a user may enter the communication operation instruction on the web page; specifically, the user may perform selection from displayed operation types, and may further enter an object type, a destination address, and the like according to requirements, and then tap a "confirm key" to send the communication operation instruction to the server.

After receiving the communication operation instruction, the server generates first client operation information, where the first client operation information includes description information of the first client, such as a user name and the line, and further includes operation information of the first client, such as an operation type and the like; and generates a random identification code corresponding to the first client operation information, stores a binding relationship, referred to as a first binding relationship, between the first client operation information and the random identification code, and returns the random identification code to the first client.

Step 603: A second client acquires operation description information, generates a binding relationship between the random identification code and the operation description information, and sends the binding relationship to the server for statistics collection.

The acquiring, by the second client, operation description information includes:

receiving, by the second client, correlation information that is entered according to entry prompt information by a user; or locally extracting, by the second client, correlation information that is saved in advance.

The binding relationship between the random identification code and the operation description information is referred to as a second binding relationship. After receiving the second binding relationship, the server may search the first binding relationship for corresponding first client operation information according to the random identification code, to set up a third binding relationship between the operation description information and the first client operation information, so as to more directly obtain communication information of the whole network.

Figure 7:
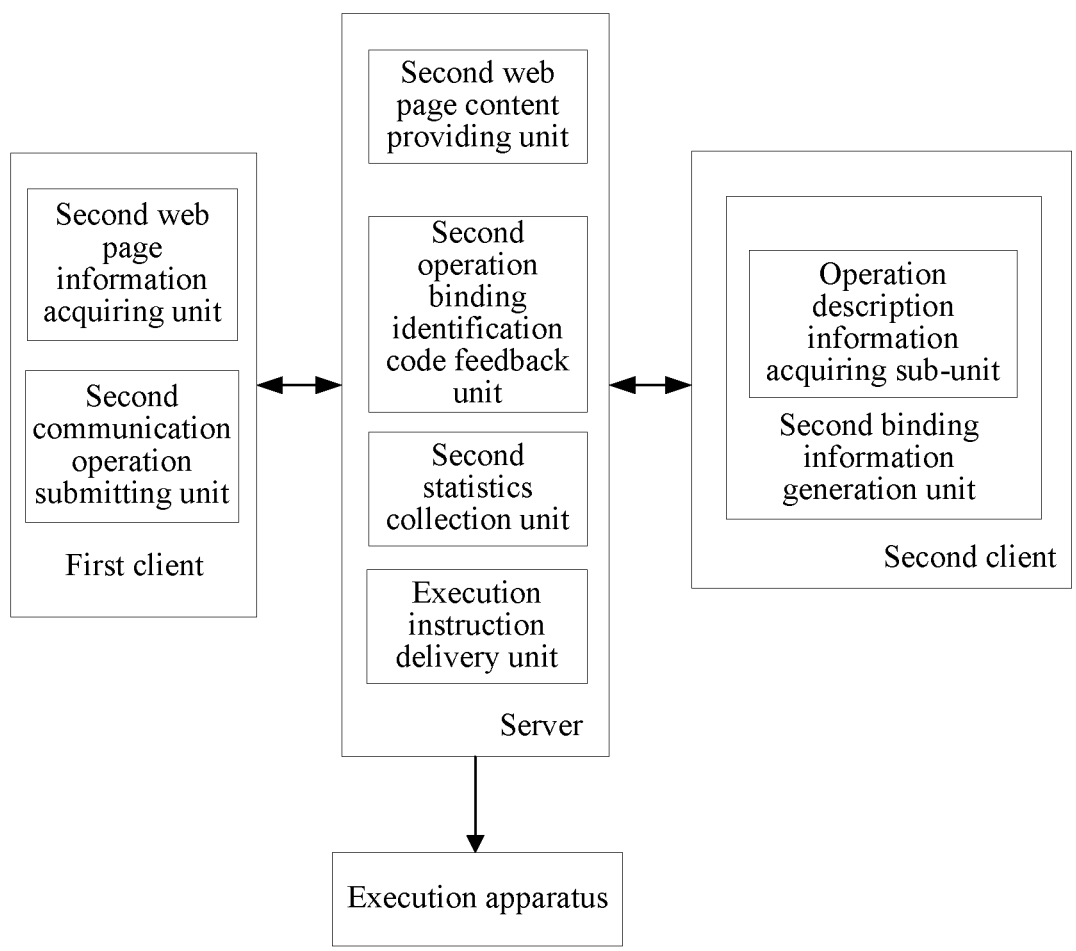
FIG. 7 is a second schematic structural diagram of a system for collecting statistics on network communication data according to the present disclosure.

Referring to FIG. 7, FIG. 7 is a second schematic structural diagram of a system for collecting statistics on network communication data according to the present disclosure. The system performs data statistics collection based on a random identification code, and includes a first client, a second client, and a server.

The first client is configured to acquire an identification code, request corresponding webpage content from a server according to the identification code, and display the webpage content; receive a user-entered communication operation instruction including an operation type, send the instruction to the server, and receive a random identification code that is returned by the server and allocated for current network communication.

The second client is configured to acquire operation description information, generate a binding relationship between the random identification code and the operation description information, and send the binding relationship to the server.

The server is configured to return corresponding webpage content to the first client according to a request; receive a communication operation instruction from the first client, generate first client operation information including an operation type; allocate a random identification code for the first client operation information, store a binding relationship between the first client operation information and the random identification code, and send the random identification code to the first client; and collect statistics on the binding relationship from the second client.

Preferably, the first client includes a second web page information acquiring unit and a second communication operation submitting unit; the second client includes a second binding information generation unit; and the server includes a second webpage content providing unit, a second bound identification code feedback unit, and a second statistics collection unit.

The second web page information acquiring unit is configured to acquire an identification code, request corresponding webpage content from the server according to the identification code, and display the webpage content.

The second communication operation submitting unit is configured to receive a user-entered communication operation instruction including an operation type, send the instruction to the server, and receive a random identification code that is returned by the server for the current network communication.

The second binding information generation unit is configured to acquire operation description information, generate a binding relationship between the random identification code and the operation description information, and send the binding relationship to the server.

The second webpage content providing unit is configured to return corresponding webpage content to the second web page information acquiring unit according to a request.

The second bound identification code feedback unit is configured to receive a communication operation instruction from the second communication operation submitting unit, generate first client operation information including an operation type, allocate a random identification code for the first client operation information, store a binding relationship between the first client operation information and the random identification code, and send the random identification code the second communication operation submitting unit.

The second statistics collection unit is configured to collect statistics on the binding relationship from the second binding information generation unit.

Preferably, the operation type includes an instant object exchange operation and a delayed object exchange operation. When the selected operation type is the instant object exchange operation, the communication operation instruction further includes an object type and a destination address, the server further includes an execution instruction delivery unit, and the system further includes an execution apparatus.

The execution instruction delivery unit is configured to receive an operation instruction from the second communication operation submitting unit, and send an execution instruction that includes the object type and the destination address to the execution apparatus.

The execution apparatus is configured to invoke, according to the execution instruction, an object matching the object type, and sends the object to the destination address.

In the present disclosure, a first client triggers statistics collection on network communication data; after a communication operation is completed, a second client generates a binding relationship according to an operation binding identification code or a random identification code that is returned by a server to the first client, and sends the binding relationship to the server for statistics collection, thereby implementing data statistics collection during network communication triggered offline.

The above is merely preferred embodiments of the present disclosure, and is not intended to limit the present disclosure. Any modification, equivalent replacement, and improvement made within the spirit and principle of the present disclosure shall fall within the protection scope of the present disclosure.

What is claimed is:

1. A method for collecting statistics on network communication data associated with a first user account of a network application running at a first client and a second user account of the network application running at a second client, wherein the first client and the second client are communicatively connected to each other via a server supporting the network application, the method comprising:

acquiring, by the first client, an identification code;

requesting, by the first client, corresponding webpage content from the server according to the identification code;

receiving and displaying, by the first client, the webpage content;

receiving, by the first client, a user-entered communication operation instruction comprising an operation type associated with the webpage content;

sending, by the first client, the communication operation instruction to the server;

receiving and displaying, by the first client, an operation binding identification code that is returned by the server, wherein the operation binding identification code includes first client operation information associated with the first user account and entry prompt information;

acquiring, by the second client, the operation binding identification code displayed on the first client;

extracting, by the second client, the first client operation information associated with the first user account and the entry prompt information from the operation binding identification code; and acquiring, by the second client, operation description information based on the entry prompt information, the operation description information including identity information associated with the second user account;

generating, by the second client, a binding relationship between the first client operation information and the operation description information; and sending, by the second client, the binding relationship to the server, wherein the server is configured to associate the binding relationship with the second user account.

2. The method according to claim 1, wherein the identification code is an one-dimensional barcode, and the step of requesting the corresponding webpage content from a server according to the identification code further comprises: parsing, by the first client, a GB code corresponding to the identification code, and sending the GB code to the server; and extracting, by the server, a URL corresponding to the GB code, and returning webpage content corresponding to the URL to the first client.

3. The method according to claim 1, wherein the identification code is a two-dimensional barcode, and the step of requesting the corresponding webpage content from a server according to the identification code further comprises: parsing, by the first client, a URL corresponding to the identification code, and requesting webpage content corresponding to the URL from the server.

4. The method according to claim 1, wherein the step of acquiring, by the second client, operation description information based on the entry prompt information comprises:

receiving, by the second client, the operation description information that is manually entered by a user according to the entry prompt information.

5. The method according to claim 1, wherein the step of acquiring, by the second client, operation description information based on the entry prompt information comprises:

extracting, by the second client, the operation description information that is pre-stored in the second client.

6. The method according to claim 1, wherein, when the selected operation type is an instant object exchange operation, the communication operation instruction further comprises an object type and a destination address.

7. The method according to claim 6, wherein after the first client sends the operation instruction to the server, the method further comprises: sending, by the server, an execution instruction that comprises the object type and the destination address to an execution apparatus; and identifying, by the execution apparatus, an object matching the object type according to the execution instruction, and sending the object to the destination address.

8. The method according to claim 1, wherein the operation binding identification code is an one-dimensional barcode, and the step of extracting the first client operation information and the entry prompt information from the operation binding identification code comprises: parsing, by the second client, a GB code corresponding to the operation binding identification code, and sending the GB code to the server; and identifying, by the server, first client operation information and entry prompt information that correspond to the GB code, and returning the first client operation information and the entry prompt information to the second client.

9. The method according to claim 1, wherein the operation binding identification code is a two-dimensional barcode, and the step of extracting the first client operation information and the entry prompt information from the operation binding identification code comprises: parsing, by the second client, the operation binding identification code, to obtain the first client operation information and the entry prompt information.

10. A distributed network system comprising a server, a first client, and a second client, wherein a first user account of a network application running at the first client and a second user account of the network application running at the second client exchange data via the server supporting the network application, wherein the first client is configured to:
acquire an identification code;
request corresponding webpage content from the server according to the identification code;
receive and display the webpage content;
receive a user-entered communication operation instruction comprising an operation type associated with the webpage content;
send the communication operation instruction to the server; and
receive and display an operation binding identification code that is returned by the server, wherein the operation binding identification code includes first client operation information associated with the first user account and entry prompt information;

wherein the second client is configured to:
acquire the operation binding identification code displayed on the first client;
extract the first client operation information associated with the first user account and the entry prompt information from the operation binding identification code; and
acquire operation description information based on the entry prompt information, the operation description information including identity information associated with the second user account;
generate a binding relationship between the first client operation information and the operation description information; and
send the binding relationship to the server;
wherein the server is configured to associate the binding relationship with the second user account.

11. The distributed network system according to claim 10, wherein the identification code is an one-dimensional barcode, and the first client is further configured to: parse a GB code corresponding to the identification code, and send the GB code to the server; and the server is configured to extract a URL corresponding to the GB code, and return webpage content corresponding to the URL to the first client.

12. The distributed network system according to claim 10, wherein the identification code is a two-dimensional barcode, and the first client is further configured to: parse a URL corresponding to the identification code, and request webpage content corresponding to the URL from the server.

13. The distributed network system according to claim 10, wherein the second client is further configured to receive the operation description information that is manually entered by a user according to the entry prompt information.

14. The distributed network system according to claim 10, wherein the second client is further configured to extract the operation description information that is pre-stored in the second client.

15. The distributed network system according to claim 10, wherein the operation binding identification code is an one-dimensional barcode, and the second client is further configured to: parse a GB code corresponding to the operation binding identification code, and send the GB code to the server; and the server is further configured to identify first client operation information and entry prompt information that correspond to the GB code, and return the first client operation information and the entry prompt information to the second client.

16. The distributed network system according to claim 10, wherein the operation binding identification code is a two-dimensional barcode, and the second client is further configured to parse the operation binding identification code to obtain the first client operation information and the entry prompt information.

* * * * *